(12) United States Patent
Ramsey et al.

(10) Patent No.: US 10,111,094 B2
(45) Date of Patent: Oct. 23, 2018

(54) WIRELESS INTRUSION DETECTION AND DEVICE FINGERPRINTING THROUGH PREAMBLE MANIPULATION

(71) Applicant: Government of the United States, as represented by the Secretary of the Air Force, Washington, DC (US)

(72) Inventors: Benjamin W Ramsey, Dayton, OH (US); Barry E Mullins, Beavercreek, OH (US)

(73) Assignee: United States of America, as represented by the Secretary of the Air Force, Washington, DC (US)

( * ) Notice: Subject to any disclaimer, the term of this patent is extended or adjusted under 35 U.S.C. 154(b) by 214 days.

(21) Appl. No.: 14/826,597

(22) Filed: Aug. 14, 2015

(65) Prior Publication Data

US 2016/0156519 A1 Jun. 2, 2016

Related U.S. Application Data

(60) Provisional application No. 62/055,362, filed on Sep. 25, 2014.

(51) Int. Cl.
*H04W 12/06* (2009.01)
*H04W 12/12* (2009.01)
(Continued)

(52) U.S. Cl.
CPC ........... *H04W 12/06* (2013.01); *H04W 12/12* (2013.01); *H04W 4/80* (2018.02); *H04W 84/18* (2013.01)

(58) Field of Classification Search
CPC ..... H04W 12/06; H04W 12/12; H04W 4/008; H04W 84/18
See application file for complete search history.

(56) References Cited

U.S. PATENT DOCUMENTS 7,340,768 B2    3/2008   Rosenberger
7,366,148 B2    4/2008   Mauddi et al.
(Continued)

OTHER PUBLICATIONS

Kulesza et. al ICCWS2014—9th International Conference on Cyber Warfare & Security: ICCWS 2014, Mar. 24, 2014, pp. 133-139.*
(Continued)

*Primary Examiner* — Noel R Beharry
*Assistant Examiner* — Richard Schnell
(74) *Attorney, Agent, or Firm* — AFMCLO/JAZ; Charles R. Figer, Jr.

(57) ABSTRACT

A method of establishing a hardware identity of a coordinating device in a wireless network is provided. A standard PHY preamble is modified to a preamble that can be received by the coordinating device having an expected hardware configuration. The modified PHY preamble is transmitted with an association request by a joining device. In response to not receiving a reply containing an association response from the coordinating device by the joining device, determining the hardware configuration of the coordinating device is not the expected hardware configuration. A further method of characterizing a hardware identity of a device in a wireless network is also provided. A request with a modified PHY preamble is transmitted to a device. If a reply is received from the device, characterizing the device as a first hardware type. And, if a reply is not received, characterizing the device as not the first hardware type.

19 Claims, 11 Drawing Sheets

(51) Int. Cl.
*H04W 84/18* (2009.01)
*H04W 4/80* (2018.01)

(56) References Cited

U.S. PATENT DOCUMENTS

| | | |
|---|---|---|
| 7,639,806 B2 | 12/2009 | Daniels et al. |
| 7,724,717 B2 | 5/2010 | Porras et al. |
| 7,778,606 B2 | 8/2010 | Ammon et al. |
| 7,853,250 B2 | 12/2010 | Harvey et al. |
| 8,249,028 B2 | 8/2012 | Porras et al. |
| 2003/0217289 A1 | 11/2003 | Ammon et al. |
| 2004/0199686 A1* | 10/2004 | Karaoguz ............... H04L 1/20 710/72 |

OTHER PUBLICATIONS

Freescale Semiconductor, Freescale BeeStack Application Development Guide for ZigBee 2007, http://www.freescale.com/files/rf_if/doc/user_guide/BSDOZB2007.pdf, 2008.
Danev et al., "Transient-based Identification of Wireless Sensor Nodes," Proc. ACM/IEEE Intl. Conf. on Information Processing in Sensor Networks (ISPN '09), pp. 25-36, 2009.
Ramsey et al, "PHY Foundation for Multi-Factor ZigBee Node Authentication," Proc. IEEE Global Communications Conf. (GLOBECOM '12), pp. 795-800, 2012.

\* cited by examiner

```
No. Time      Source                    Destination  Protocol        Length  Info
1   0.000000  00:50:c2:12:5c:0d:58:07   0x0000       IEEE 802.15.4   23      Association
                                                                             Request
2   0.000000                                         IEEE 802.15.4   5       Ack
3   1.000000  00:50:c2:12:5c:0d:58:07   0x0000       IEEE 802.15.4   20      Data Request
4   1.000001                                         IEEE 802.15.4   5       Ack
5   1.000002  00:50:c2:12:1c:07:9c:09   00:50:c2:12:5c:0d:58:07  IEEE 802.15.4  27  Association
                                                                             Response,
                                                                             PAN: 0x1aaa
                                                                             Addr: 0x796f
```

*FIG. 9*

```
No. Time      Source                    Destination  Protocol        Length  Info
1   0.000000  00:50:c2:12:5c:0d:58:07   0x0000       IEEE 802.15.4   23      Association
                                                                             Request
2   1.000000  00:50:c2:12:5c:0d:58:07   0x0000       IEEE 802.15.4   20      Data Request
3   1.000000                                         IEEE 802.15.4   5       Ack
```

*FIG. 10*

WIRELESS INTRUSION DETECTION AND DEVICE FINGERPRINTING THROUGH PREAMBLE MANIPULATION

CROSS-REFERENCE TO RELATED APPLICATIONS

This application claims the benefit of and priority to U.S. Provisional Application Ser. No. 62/055,362, entitled "Wireless Intrusion Detection and Device Fingerprinting through Preamble Manipulation," filed on Sep. 25, 2014, the entirety of which is incorporated by reference herein.

RIGHTS OF THE GOVERNMENT

The invention described herein may be manufactured and used by or for the Government of the United States for all governmental purposes without the payment of any royalty.

BACKGROUND OF THE INVENTION

Field of the Invention

The present invention generally relates to wireless networks and, more particularly, to wireless intrusion detection.

Description of the Related Art

Low-rate Wireless Personal Area Networks (WPANs) enable energy-efficient connectivity among large numbers of devices. The IEEE 802.15.4 specification is an industry standard for low-power, low-rate, WPANs. Low implementation costs associated with WPAN interconnectivity has led to widespread adoption, particularly in critical infrastructure and military applications. For instance, ZigBee standards built upon this WPAN foundation operate advanced utility meters, 65 million of which will be deployed in the United States by 2015. Building automation WPANs interface with the smart grid to significantly reduce energy costs through intelligent appliance and lighting control. WPANs may be utilized in such varied applications as health care networks, indoor localization, and critical process control.

Data confidentiality, message integrity, and device authentication are all important security considerations for wireless networks, given the vulnerable transmission medium. Fortunately, the IEEE 802.15.4 specification includes optional protection using the Advanced Encryption Standard for data confidentiality, message integrity codes (MICs), or both. Sensitive information such as utility billing, patient data, and control messages should all be encrypted while traversing a WPAN, but research has found that the Advanced Encryption Standard (AES) Counter mode (encryption without MIC) should be avoided because an attacker may be able to modify the cyphertext and the unprotected cyclic redundancy check such that unauthorized packets may be accepted. Protecting WPANs from unauthorized access may be accomplished with a shared network key and establishing source node authentication through end-to-end Link Keys.

Properly securing low-rate WPANs is challenging due to tight resource constraints. WPAN hardware is generally designed to be as inexpensive as possible, and tamper resistance was not an early vendor priority. For example, first and second-generation ZigBee chips were found to be vulnerable to encryption key extraction. Flash memory available for application development is typically limited to less than 100 kB, e.g., 48 kB on the TmoteSky mote and 60 kB on the Freescale MC13213. With flash at a premium, some application developer guides discourage the use of security—"Do not use a secure network unless required. ZigBee security is about 8K." (*Freescale BeeStack™ Application Development Guide*, Document Number: BSADG, Rev. 1.1, January 2008, p. 5-5). Security headers increase packet overhead, expending additional wireless transmission energy and presenting a trade-off for WPANs reliant upon battery power. IEEE 802.15.4 leaves key establishment to higher layers, such as the ZigBee stack, yet the entire WPAN can be compromised if keys are mishandled. Support for access control lists varies substantially among WPAN chipsets as well. For example, a CC2420 only supports two device entries.

Any network keys wirelessly distributed in plain text to end nodes can be intercepted by eavesdroppers. The open source KillerBee framework for exploiting IEEE 802.15.4 WPANs includes a script (zbdsniff) that extracts any observed keys from wireless capture files. KillerBee also includes tools for message replay attacks (zbreplay), transmitter tracking (zbfind), and denial of service attacks (zbassocflood).

The consequence of a successful denial of service attack by zbassocflood is shown at 10 in FIG. 1. All available WPAN network addresses have been allocated to devices that do not exist, as reported in the 'PAN full' line highlighted 10. The zbassocflood tool made repeated association requests using spoofed MAC addresses, exhausting the network address pool, and thus, no new legitimate devices are able to join the network. Continual improvements to the quality and capabilities of WPAN attack tools motivate the need for novel defenses.

Accordingly, there is a need in the art for improved intrusion detection and defenses for attacks on WPANs.

SUMMARY OF THE INVENTION

Wireless networks are particularly vulnerable to spoofing and route poisoning attacks due to the contested transmission medium. Embodiments of the invention demonstrate a novel and complementary approach to exploiting physical layer differences among wireless devices that is more energy efficient and invariant with respect to the environment. Specifically, the embodiments exploit subtle design differences among transceiver hardware types. Transceivers fulfill the physical layer aspects of wireless networking protocols, yet specific hardware implementations vary among manufacturers and device types. Precise manipulation of the physical layer preamble may assist in preventing a subset of transceiver types from receiving the modified packet. By soliciting acknowledgments from wireless devices using a small number of packets with modified preambles, a response pattern identifies the true transceiver class of the device under test. Herein the embodiments demonstrate a transceiver taxonomy of eight manufacturers into seven classes with greater than 99% accuracy, irrespective of environment. Wireless multi-factor authentication, intrusion detection, and transceiver type fingerprinting through preamble manipulation is successfully demonstrated.

Embodiments of the invention provide a hardware environment and a method for establishing hardware identity of a coordinating device in a wireless network by a joining device. A standard PHY preamble is modified by the joining device to a preamble that can be received by the coordinating device having an expected hardware configuration. The modified PHY preamble is transmitted to the coordinating device with an association request by the joining device. If a response containing an association response from the coordinating device is not received by the joining device, the hardware configuration of the coordinating device is determined to not be the expected hardware configuration.

In some embodiments, if, in response to receiving a reply from the coordinating device, the standard PHY preamble is modified to a second modified preamble that can be received by the coordinating device having the expected hardware configuration and transmitted with a data request to the coordinating device. If a response containing an acknowledgment response from the coordinating device is not received by the joining device, the hardware configuration of the coordinating device is determined to not be the expected hardware configuration.

Embodiments of the invention may also be used to characterize a hardware identity of a device in a wireless network. A request with a modified PHY preamble is transmitted to the device. If a reply is received from the device, the device is characterized as a first hardware type. If no reply is received from the device, characterizing the device as not the first hardware type.

In some embodiments were no reply is received, a request is transmitted with a second modified PHY preamble different from the first modified PHY preamble. If a reply is received from the device, the device is characterized as a second hardware type. If no reply is received from the device, the device is characterized as not the first or second hardware type.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

FIG. 9 illustrates a successful association request sequence;

FIG. 10 illustrates a failed association request sequence;

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

Wireless Personal Area Networks (WPAN) fulfill critical functions in healthcare, automation, and smart energy systems. However, WPAN devices are challenging to secure due to tight design constraints on cost, computing resources, and energy use. WPAN devices implement physical layer (PHY) features of the IEEE 802.15.4 standard in their transceiver hardware. While software tools such as Killer-Bee can generate arbitrary message payloads, low level specifications such as frame synchronization and the wireless preamble are immutable from software. The only alterable physical layer parameter on a WPAN device is the operating RF channel.

Device authentication is a fundamental process in communication networks. Ostensibly immutable hardware addresses (e.g., MAC addresses) often serve as the lowest level "true" hardware identity. However, MAC address spoofing is straightforward with open source tools such as macchanger for IEEE 802.11 and zbassocflood for IEEE 802.15.4. Cryptographic credentials are another method for establishing device authentication, as long as the credentials have not been compromised. Multi-factor authentication relies upon two or more presentations by the device in question. For example, WPANs may utilize both MAC address filtering and a private network key (NWK) as two-factor authentication.

Figure 1:
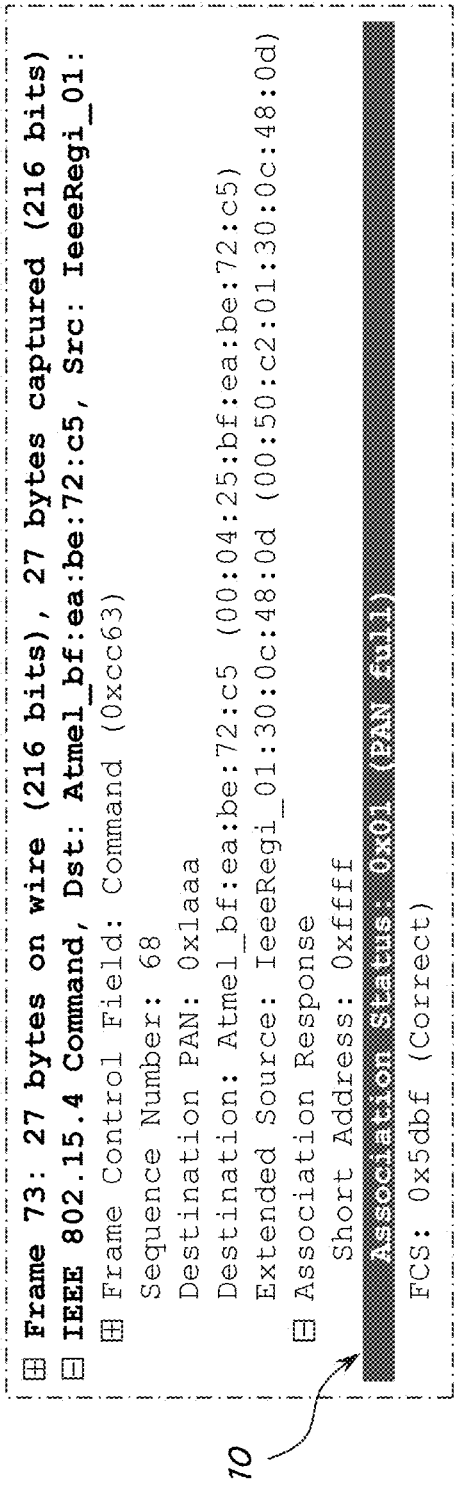
FIG. 1 is an example of an association request failure due to zbassocflood attack.
Figure 2:
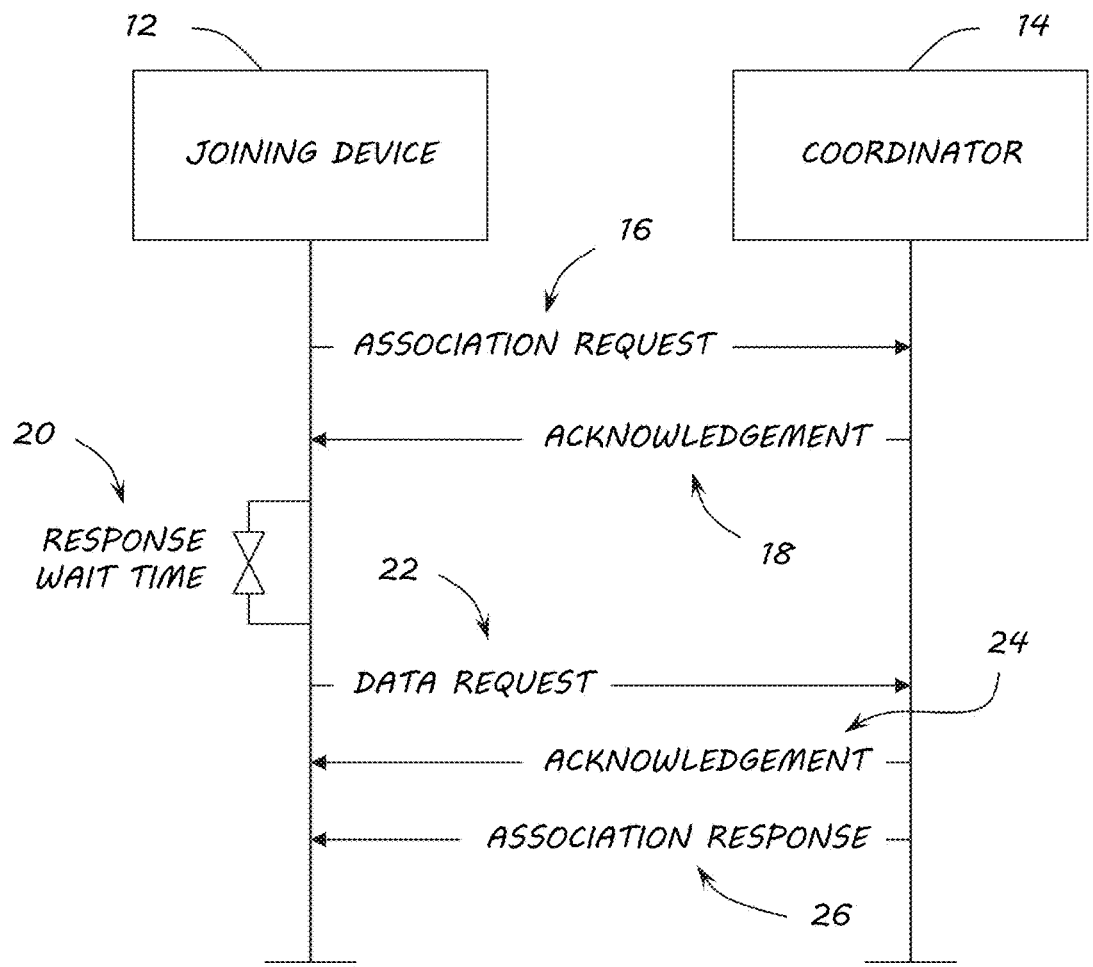
FIG. 2 illustrates an IEEE 802.15.4 association request message sequence.

A simplistic and fundamental authentication exchange in IEEE 802.15.4 networks is the association request. FIG. 2 illustrates the association request message sequence between a device 12 seeking to join a network and a WPAN coordinator 14. The message sequence begins with an association request 16 from the joining device 12. The association request 16 includes the joining device's 64-bit [claimed] MAC address and is sent to the network coordinator's 14 NWK address (0x0000). The coordinator's 14 transceiver automatically replies with an acknowledgment 18 while the coordinator 14 begins determining whether or not the device 12 may join the network. If the coordinator 14 uses a MAC address white list for authentication, a network address will only be provided to a device presenting an approved MAC address. The coordinator 14 also determines whether or not there are any unused network addresses in its address pool available for dissemination. While the coordinator 14 performs these computations, the joining device 12 waits a short period of time 20 (e.g., one second) before requesting a response. After the response wait time the joining device 12 sends a data request 22 to the coordinator 14, generating another automatic acknowledgment 24. The final message is an association response 26 from the coordinator 14. The association response 26 either includes a valid network address assigned to the joining 12 device, or it declines the association request 26 (as in FIG. 1 for a full WPAN).

In one exemplary implementation of an embodiment of the invention, a digital storage oscilloscope and an Arbitrary Waveform Generator (AWG) were used to manipulate the wireless preambles. A Tektronix TDS6124C oscilloscope received and stored standard (unmodified PHY) packets as MATLAB® vectors of instantaneous signal amplitudes. After manipulating the packet preambles in MATLAB®, the altered packets were replayed on a Tektronix AWG7102.

In an alternate exemplary implementation of an embodiment of the invention, a National Instruments (NI) USRP-2921 software-defined radio was used to manipulate the wireless preambles. The NI USRP-2921 receives and stores standard (unmodified PHY) WPAN packets as vectors of instantaneous In-phase and Quadrature (I/Q) measurements. The I/Q data array takes the interleaved form $$[I_0 Q_0 I_1 Q_1 I_2 Q_2 \ldots I_n Q_n] \quad (1)$$

where n is the number of acquired samples. After manipulating the packet preambles in MATLAB®, the altered packets were replayed on the USRP. The modified beacon requests feature PHY payloads of 10 bytes. Given the IEEE 802.15.4 PHY header length of 6 bytes (4 byte preamble+1 byte SFD+1 byte Frame Length), total transmission length is 16 bytes for beacon requests. Two O-QPSK symbols represent each byte for total transmission lengths of 32 symbols. Symbol duration is 16 µs resulting in total transmissions of 512 µs. The USRP collection rate is two million in-phase and quadrature (I/Q) sample pairs per second, sufficient for RD replays. The USRP streams RF recordings of standard packets to a Dell Precision M4500 laptop via gigabit Ethernet cable. One of ordinary skill in the art will recognize that other hardware may also be used other than that set out in the above two exemplary implementations. For example, any hardware with sufficient transceiver flexibility may be used to transmit packets with manipulated PHY preambles, and which includes at least one standard WPAN transceiver.

Short packets for which receiver reply is compulsory were chosen to assess differences in transceiver implementations among manufacturers. WPAN transceivers automatically respond to acknowledgment requests within 5 ms. Packets for which reply is compulsory include beacon requests (discussed below) and data requests with an acknowledgment flag set. Both beacon requests and data requests can be addressed to solicit a reply from one networked device at a time. If the receiver responds to packets with modified preambles, it means the receiver is able to correctly receive and interpret messages. If the device does not generate a reply in response to repeated messages, the packets must have been either corrupted by wireless interference or are uninterpretable by the receiver. The influence of wireless noise was mitigated by operating on IEEE 802.15.4 channel 26 (2.480 GHz), outside the spectrum of nearby IEEE 802.11g access points, though channels other than channel 26 may be also be used to avoid other potential sources of interference. Trial repetition further assisted in mitigating random wireless interference.

Table 1 lists eight transceiver types under test. Rather than refer to the eight transceiver types by their full device name, the two letter abbreviations in Table 1 will be used in the descriptions below. One of ordinary skill in the art will realize that these eight transceiver types are selected for illustrative purposes and that the embodiments of the invention are not limited to only these eight. Embodiments of the invention may be used with other transceiver types not identified in Table 1.

TABLE 1

Eight transceiver types under test.

| Manufacturer | Model Number | Abbreviation |
| --- | --- | --- |
| Atmel | AT86RF230 | AT |
| Digi International | XBP24CZ7PIS | XB |
| Freescale | MC13213 | FS |
| Jennic | JN5148 | JN |
| Microchip Technology | MRF24J40MA | MC |
| Silicon Labs | EM357 | EM |
| STMicroelectronics | STM32W | ST |
| Texas Instruments | CC2420 | TI |

The standard IEEE 802.15.4 preamble consists of eight symbols, each representing the hexadecimal value 0x0. The standard preamble is manipulated in three ways: 1) decrease the number of preamble symbols to fewer than eight, 2) alter the preamble symbol composition, or 3) alter the Frame Length field. All manipulations involve the removal or replacement of entire O-QPSK symbols. Individual symbols are removed from the preamble by replacing them with background noise of equal duration (16 µs) from elsewhere in the signal collection. Symbol replacement consisted of copying symbols representing other binary values from elsewhere in the packet to the PHY header region.

Contents of the IEEE 802.15.4 PHY header, including the preamble, are stripped by the transceiver and are not accessible to higher layers of the network stack. Validation of the symbol-wise preamble manipulations ensures the manipulation results in the intended changes. A first check is visual inspection of the stored signal plots. The vector of instantaneous signal magnitude values is plotted using MATLAB®.

Figure 3A:
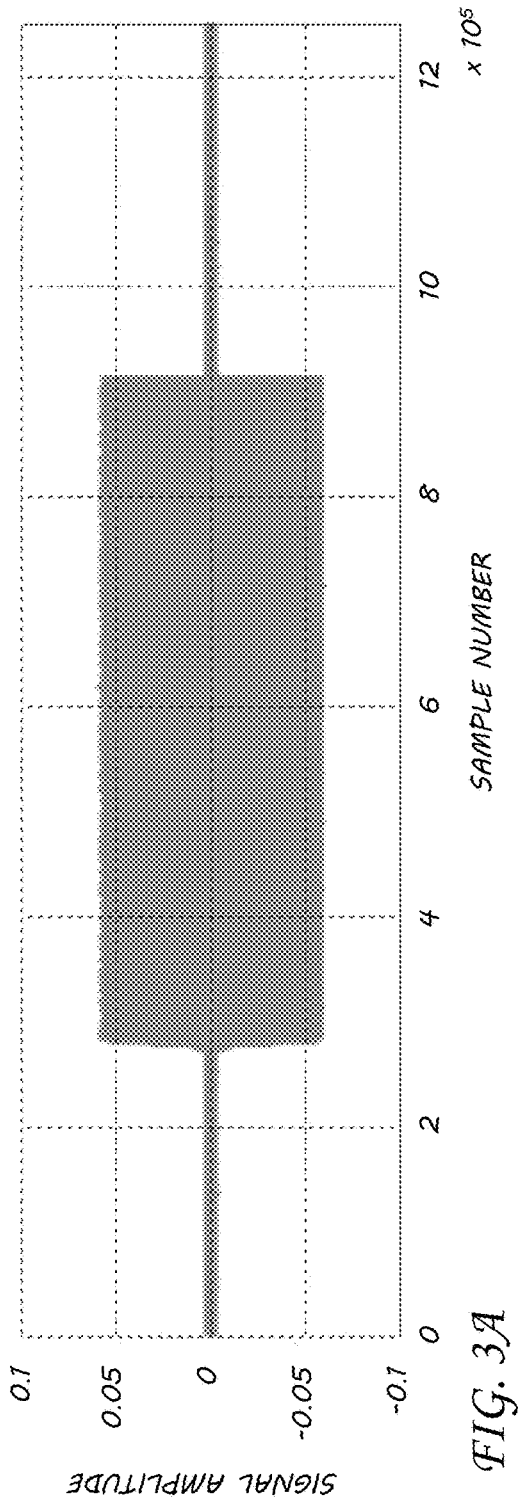
FIGS. 3A and 3B includes graphs illustrating beacon request with standard preamble and shortened preamble.
Figure 3B:
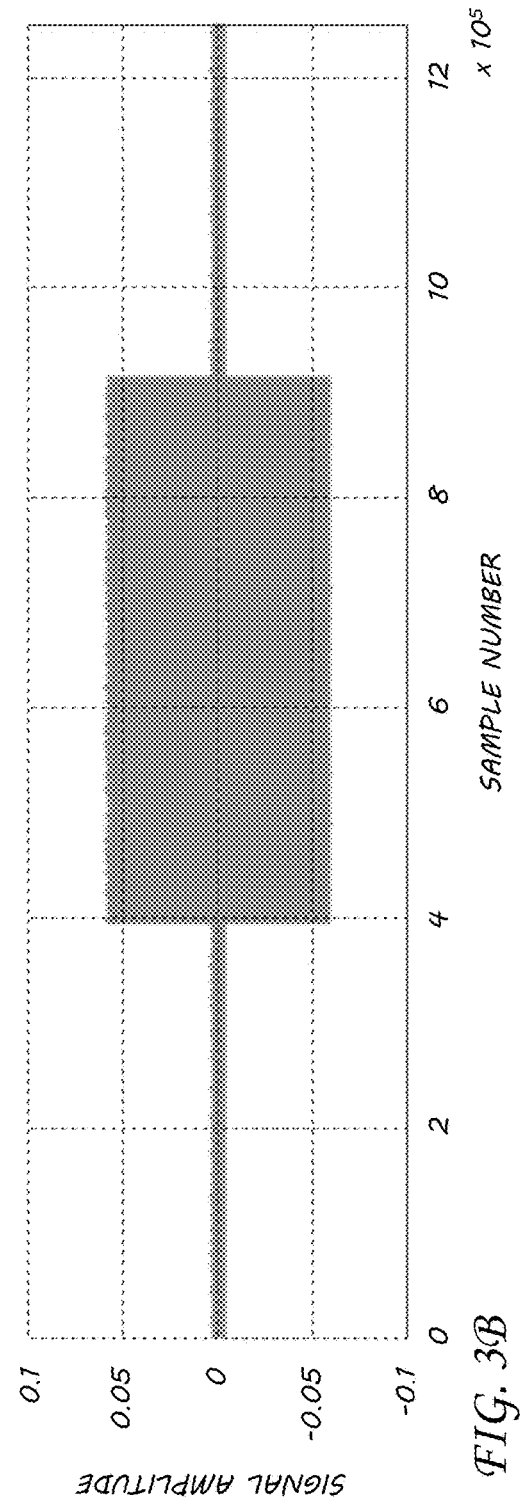

Standard beacon requests from one device feature well-defined signal beginning and end as illustrated in the graph in FIG. 3A. The entire beacon request transmission decreases by 18.75% as illustrated in the graph in FIG. 3B when the preamble is shortened from eight symbols to two. Visual inspection of the two plots confirms that the leading edge of the transmission, the preamble, was shortened by replacing part of it (the first six O-QPSK symbols) with background noise (the signal collection region of significantly lower magnitude).

Figure 4A:
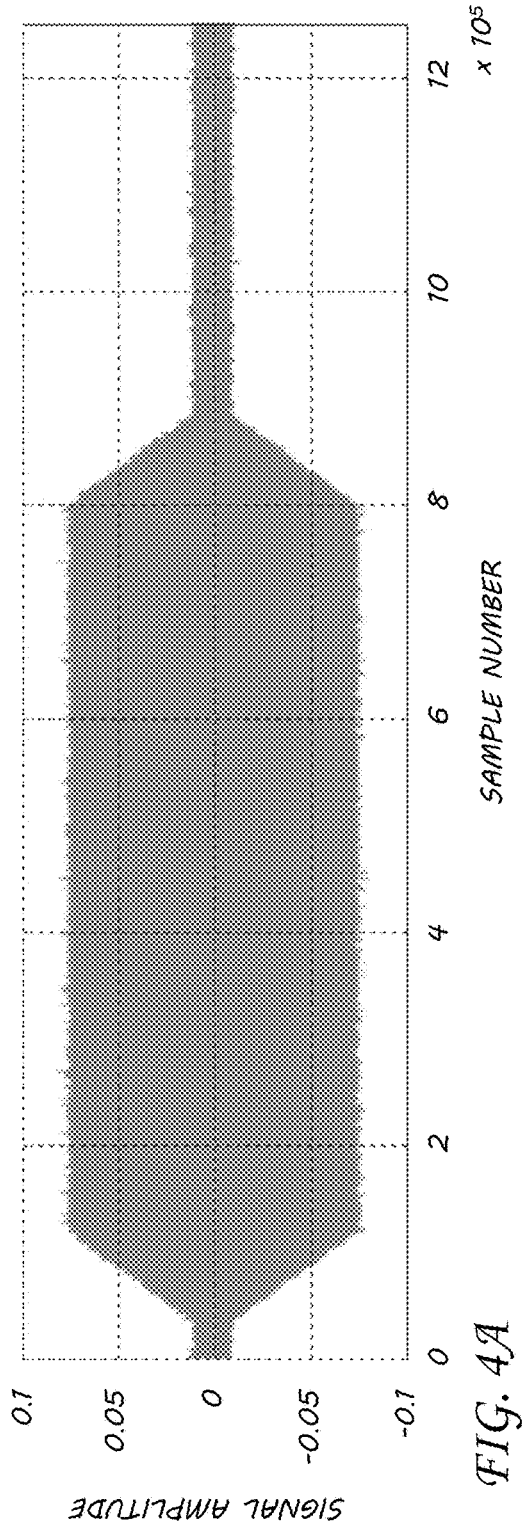
FIGS. 4A and 4B includes graphs illustrating data requests with lengthy transients and a modified version.
Figure 4B:
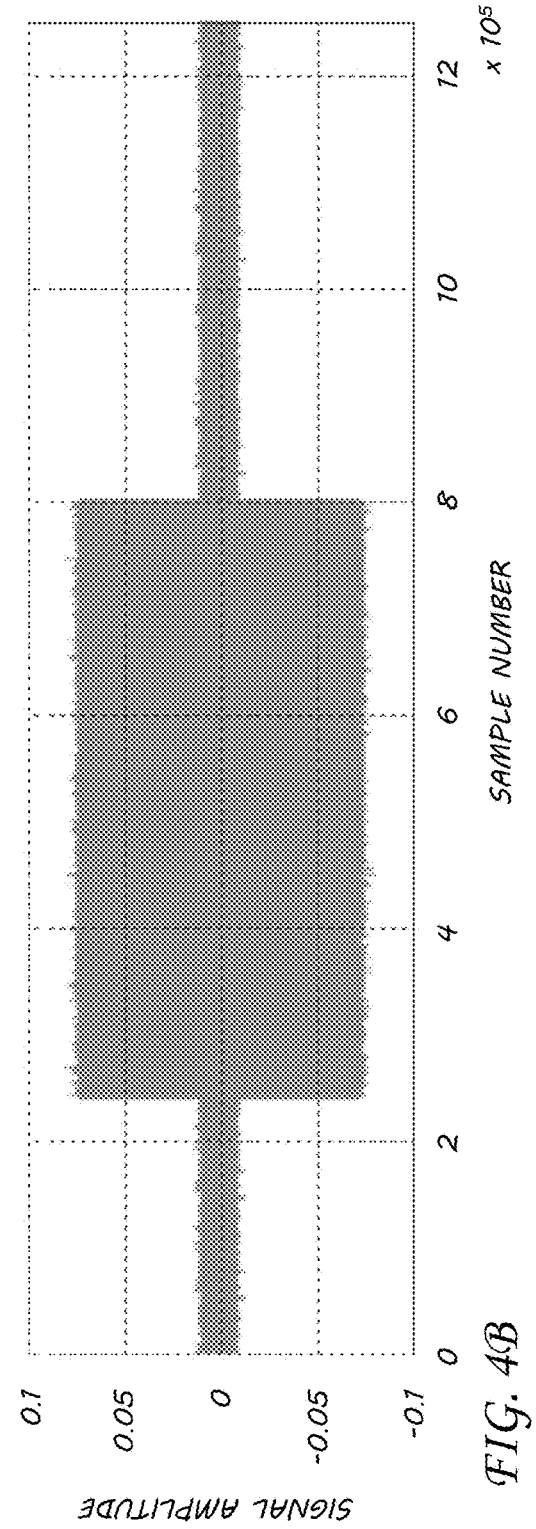

Standard data requests from another device type illustrated in FIG. 4A appears to include unmodulated transceiver power-up and power-downs of approximately 69 µs each. The high-amplitude region between these two transient regions precisely match the expected signal duration (544 µs) according to the IEEE 802.15.4 specification. The nonmodulated transients are removed and the modified collection is transmitted to all eight transceiver types under test. Every transceiver under test responds to the altered data request, demonstrating that the transients are an artifact of that particular transmitter and do not contain modulated data. The entire data request transmission decreases by 17.65% when the preamble is shortened from eight symbols to two as illustrated in FIG. 4B.

While preamble shortening can be verified visually in a signal magnitude plot, individual symbol replacement results in preambles of identical length to the standard. If, for example, the transmission preamble is changed from 0x00000000 to 0x0000A700, the two versions are indiscernible in plots such as those in FIGS. 3A and 3B. In order to demonstrate that the preamble manipulation methodology is successful, arbitrary symbols are copied from the PHY header to the Frame Check Sequence (FCS) at the end of the transmission. In one such demonstration the SFD symbols 0xa7 are copied 28 to the FCS 29 in a beacon request illustrated in FIG. 5. This requires understanding of the data content of the beacon request and a geometric conception of where the SFD is within the transmission. Since the SFD immediately follows the preamble, knowledge of its exact location in the file to be manipulated and replayed by the USRP confirms that symbol-wise PHY manipulation of the preamble is also accurate. A beacon request is transmitted with this precisely-corrupted FCS to a packet sniffer for observation in Wireshark. The reproduction of the screenshot in FIG. 6 demonstrates that the FCS corrupts 30 as expected. The correct FCS value of 0xc537 changes to 0xa737, read in reverse byte order.

The IEEE 802.15.4 specification mandates a standard wireless preamble for every transmission. Manufactures design their receiver hardware to use this preamble for O-QPSK symbol synchronization of incoming transmissions. Exact receiver implementations of this process vary among manufacturers, however, due to the proprietary nature of hardware design. These subtle variations in hardware design are what are to be leveraged in the embodiments of the invention to differentiate among transceiver manufacturers simply by observing how each device type responds to packets with preambles that deviate from the IEEE 802.15.4 standard.

The standard preamble consists of eight identical symbols, each representing the hexadecimal value 0x0. Thousands of symbol-wise alterations to this standard are possible. The preamble can lengthen or shorten, and non-zero symbols can replace the standard zero symbols. An exploratory analysis of possible preamble modifications was conducted and six nonstandard preambles were discovered that were useful for intermanufacturer discrimination. These significant nonstandard preambles are as follows:

0x0000 (Preamble shortened to four symbols)
0x000 (Preamble shortened to three symbols)
0x00 (Preamble shortened to two symbols)
0x0000000a (Eighth symbol changed to 0xa)
0x000000aa (Last 2 symbols changed to 0xaa)
0x0000a700 (Symbols 5-6 changed to 0xa7)

All devices reply to at least some requests with preambles shortened to five symbols, but differences were not substantial enough to be useful. Furthermore, all devices fail to receive any packets when the preamble is shortened to a single symbol or alter the synchronization header.

For the implementation utilizing the AWG, the eight transceiver types listed in Table 1 were powered one at a time, one meter from the AWG. Transmissions from the AWG were not amplified so its effective transmission power was significantly less than 1 mW. An Atmel RZUSBstick reported mean received signal strength one meter from the AWG at only −91 dBm. Field research with 1 mW transmitters and the RZUSBstick found that −91 dBm signal strength corresponded to indoor distances of approximately 23 meters, so these close-range, low-power experiments replicate signal reception conditions found in large indoor networks.

For the implementation with the USRP, each of the eight transceiver types listed in Table 1 were powered one at a time, one half meter from the USRP. The USRP had an attached 3 dBi gain dipole antenna oriented vertically. In this implementation, the RZUSBstick reported mean received signal strength 0.5 meters from the transmitter of −61 dBm.

As each of the eight transceiver types were powered in the AWG implementation, the AWG transmitted one beacon request per second for 200 consecutive seconds, though other time frames could also be used. Each transceiver type was subjected to seven trials (I through VII), illustrated in Table 2. In the first trial (Trial I) the AWG transmitted standard beacon requests without modification. During the subsequent six trials (Trials II through VII), the AWG transmitted beacon requests with a particular modification (performed in MATLAB®) to the standard preamble. Trial I established a confirmation baseline that the device under test functions properly, responded to all beacon requests it observes, and that the wireless sniffer observed all replies. Trials II through VII investigated the ability of the device under test to correctly receive packets with altered preambles, and thus reply to them. Replies from the device under test were observed using wireless sniffers including the Zena Wireless Adapter and the Atmel RZUSBstick.

TABLE 2

Preamble variations under test.

| Trial Number | Preamble Used |
|---|---|
| I | 0x00000000 (standard) |
| II | 0x0000 |
| III | 0x000 |
| IV | 0x00 |
| V | 0x0000000A |
| VI | 0x000000AA |
| VII | 0x0000A700 |

The outcome of each beacon request transmission is a binomial process wherein one of two possible outcomes is realized; either the device under test correctly receives the packet and replies or it does not. A binomial confidence interval is calculated for each 200-packet trial using $$\hat{p} \pm z_{(1-0.5\alpha)} \sqrt{\frac{1}{n}\hat{p}(1-\hat{p})} \qquad (2)$$

Where $\hat{p}$ is the proportion of successes in a binomial process estimated from the statistical sample, a is the error percentile, and n is the sample size. For a 99% confidence interval (CI) the error a is 1%, so $z_{(1-0.5\alpha)}$=2.81. Table 3 illustrates device response probabilities for the seven wireless preamble versions (Trials I-VII).

TABLE 3

Device response rates vs. preamble modification
(AWG as the transmitter) - 99% CI.

| | Preamble Used | | | | | | |
|---|---|---|---|---|---|---|---|
| Device | (Standard) 00000000 | 0000 | 000 | 00 | 0000000A | 000000AA | 0000A700 |
| AT | [98%, 100%] | 0 | 0 | 0 | [98%, 100%] | [97%, 100%] | [98%, 100%] |
| XB | 100% | [0%, 3%] | 0 | 0 | 0 | [91%, 100%] | [97%, 100%] |
| FS | 100% | [91%, 100%] | [6%, 14%] | 0 | [98%, 100%] | [98%, 100%] | 0 |
| JN | 100% | [97%, 100%] | [98%, 100%] | [98%, 100%] | 0 | 0 | 0 |
| MC | [96%, 100%] | 0 | 0 | 0 | 0 | 0 | 0 |
| EM | [97%, 100%] | [0%, 4%] | 0 | 0 | 0 | 100% | [94%, 100%] |
| ST | 100% | 0 | 0 | 0 | 0 | [24%, 42%] | 0 |
| TI | 100% | 100% | [95%, 100%] | [11%, 27%] | 0 | 0 | 0 |

As each of the eight transceiver types were powered in the USRP implementation, the USRP transmitted one beacon request per second for 500 consecutive seconds, though as with the other implementation, other time frames may also be used. The outcome of each beacon request transmission is also a binomial process where one of two possible outcomes was realized; either the device under test correctly received the packet and replied or it did not. Prior to each manipulated beacon request trial, the USRP transmitted standard beacon requests without manipulation to establish the transceiver under test was functioning normally. During subsequent trials outlined in Tables 4-10 and the PHY preamble is modified in MATLAB® and then the modified packets are transmitted from the USRP as done before with the AWG.

TABLE 4

Packet Reception Rates versus Modified Preambles
with trailing 0xF Nibbles (−61 dB)

| Preamble | AT | XB | FS | JN | MC | EM | ST | TI |
|---|---|---|---|---|---|---|---|---|
| 0000000F | 100% | 100% | — | — | — | 100% | 100% | — |
| 000000FF | 100% | 79% | — | — | — | 90% | 100% | — |
| 00000FFF | 93% | 65% | — | — | — | 83% | 17% | — |

TABLE 5

Packet Reception Rates versus Modified Preambles
with trailing 0xF Nibbles (−76 dB)

| Preamble | AT | XB | FS | JN | MC | EM | ST | TI |
|---|---|---|---|---|---|---|---|---|
| 0000000F | 100% | 100% | — | — | — | 100% | 100% | — |
| 000000FF | 100% | 86% | — | — | — | 79% | 100% | — |
| 00000FFF | 96% | 78% | — | — | — | 71% | 20% | — |

TABLE 6

Packet Reception Rates versus Modified
Preambles with Leading Ones

| Preamble | AT | XB | FS | JN | MC | EM | ST | TI |
|---|---|---|---|---|---|---|---|---|
| F0000000 | 100% | 100% | 100% | 100% | 100% | 100% | 100% | 100% |
| FF000000 | 92% | 93% | 96% | 100% | 100% | 69% | 100% | 100% |
| FFF00000 | — | — | 68% | 100% | 63% | — | — | 100% |
| FFFF0000 | — | — | 67% | 100% | — | — | — | 100% |
| FFFFF000 | — | — | 6% | 100% | — | — | — | 94% |
| FFFFFF00 | — | — | — | 73% | — | — | — | 90% |

TABLE 7

Packet Reception Rates versus Modified Preambles
with Injected State Frame Delimiters

| Preamble | AT | XB | FS | JN | MC | EM | ST | TI |
|---|---|---|---|---|---|---|---|---|
| A7000000 | 100% | 100% | 100% | 100% | 100% | 100% | 100% | 100% |
| 0A700000 | 1% | 53% | 87% | 83% | 6% | 59% | 46% | 100% |
| 00A70000 | 5% | — | 81% | 20% | — | — | — | 6% |
| 000A7000 | 100% | 29% | 9% | — | — | 7% | 20% | 80% |
| 0000A700 | 100% | — | — | — | — | — | — | — |
| 00000A70 | 100% | — | 94% | — | — | — | — | — |
| 000000A7 | 18% | — | — | — | — | — | — | — |

TABLE 8

Packet Reception Rates versus Modified Preambles with trailing 0xA Nibbles

| Preamble | AT | XB | FS | JN | MC | EM | ST | TI |
|---|---|---|---|---|---|---|---|---|
| AA000000 | 100% | 100% | 100% | 100% | 100% | 100% | 100% | 100% |
| 0AA00000 | 1% | 71% | 88% | 100% | 89% | 75% | 74% | 100% |
| 00AA0000 | 7% | — | 83% | 100% | — | — | — | 100% |
| 000AA000 | 88% | 61% | 13% | 100% | — | 67% | 48% | 95% |
| 0000AA00 | 91% | 49% | 88% | 78% | — | 39% | 28% | 90% |
| 00000AA0 | 94% | 100% | 88% | — | — | 100% | 62% | — |
| 000000AA | 100% | 72% | 82% | — | — | 73% | 55% | — |
| 0000000A | 100% | 84% | 90% | — | — | 75% | 58% | — |

TABLE 9

Packet Reception Rates versus Frame Length Field in the PHY Header (Standard Preambles)

| Length | AT | XB | FS | JN | MC | EM | ST | TI |
|---|---|---|---|---|---|---|---|---|
| $10_d$ | 100% | 100% | 100% | 100% | 100% | 100% | 100% | 100% |
| $138_d$ | 100% | — | 100% | 100% | 100% | — | — | — |

TABLE 10

Packet Reception Rates versus Notable PHY Header Manipulations

| Preamble | Length | AT | XB | FS | JN | MC | EM | ST | TI |
|---|---|---|---|---|---|---|---|---|---|
| 0000A700 | $138_d$ | 100% | — | — | — | — | — | — | — |
| 0F070AFF | $10_d$ | — | 16% | — | — | — | 3% | 2% | — |
| 0A07AA0A | $138_d$ | — | — | 20% | — | — | — | — | — |
| 7A77A700 | $138_d$ | — | — | — | 100% | — | — | — | — |
| FFFFFF00 | $10_d$ | — | — | — | 73% | — | — | — | 90% |

Results in Tables 3 through 10 over the two exemplary implementations demonstrate consistency in device response rates to specific preamble modifications. No evidence was found that differences in transmission power, propagation distance, or power supply voltage confound modified packet reception. Reply rates for all device types decline monotonically as the preamble shortens from eight symbols to two (Trials I-IV). This is intuitive since the transceivers must successfully synchronize to the incoming packet using fewer and fewer symbols. The reply rates also reveal subtle implementation differences among device types. For example, the MC13213 frequently replies when the preamble is 0x0000000A or 0x000000AA, but fails completely for 0x0000A700. The presence of a false SFD (0xA7) prior to the true SFD following the preamble causes 100% packet reply failure in seven of the devices. Contrastingly, the AT transceiver is indifferent to which symbols comprise the preamble, but fails for preambles shorted to four symbols or fewer.

With respect to the USRP implementation and Tables 4-10, reply rates for all transceiver types decline monotonically as additional trailing 0xF nibbles replace the standard 0x0 nibbles within the preamble (Table 4). Dashes indicate that no replies are observed in response to the 500 manipulated beacon requests, and thus identify manipulations of interest. For example, transceivers FS, JN, MC, and TI are never able to correctly receive beacon requests with 0xF as the last nibble in incoming preambles (Table 4). Device reply rates and thresholds remain consistent even when received signal power at the transceivers under test decreases from −61 dBm (Table 4) to −76 dBm (Table 5). These results demonstrate the salient nature of the PHY preamble manipulation framework in response to varying signal-to-noise ratios. For all subsequent trials (Tables 6-10) received signal strength at the transceiver under test was −61 dBm.

The data presented above illustrates that packet replies in response to shortened preambles are equivalent to those in response to preambles with an equal number of leading 0xF nibbles. For example, transceiver reply rates in response to a preamble of only four 0x0 nibbles were equivalent to replay rates in response to preambles with four leading 0xF nibbles. Table 6 is a packet reply report for both manipulation types. Here again, packet replies decrease monotonically as the preambles deviate more significantly from the IEEE 802.15.4 standard. Notably, none of the eight transceivers successfully receive packets with preambles that lack a 0x00 byte at the preamble tail. Only transceivers JN and TI successfully receive packets with the first three quarters of the standard preamble removed or replaced with 0xF nibbles, so a successful reply in response to such packets narrows the true identity of the transceiver under test to JN or TI. The CC2420 transceiver ("TI") also serves as a radio core of contemporary systems-on-a-chip, such as the CC2430 and CC2531. Analysis confirms that all such Texas Instruments chips follow equivalent response patterns.

Figures 5, 6:
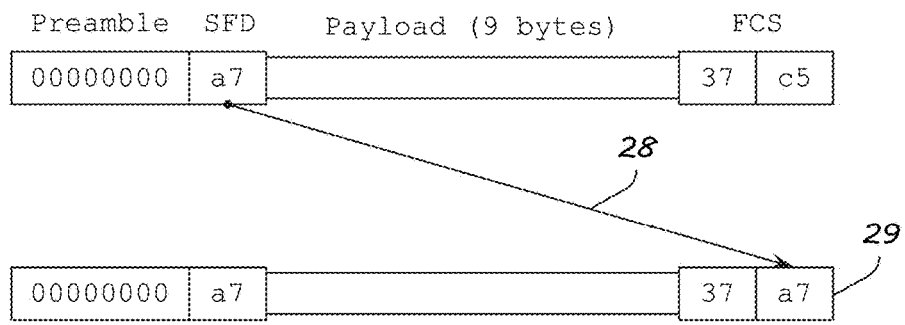
FIG. 5 is an illustration of PHY packet manipulation in MATLAB®.
FIG. 6 is an example of wireshark capture of a PHY-manipulated packet.

Another preamble manipulation is the replacement of one preamble byte with a false SFD byte 0xA7 as illustrated in FIG. 5. Table 7 reports transceiver reply rates in response to the seven possible SFD insertions with in a standard 8-byte preamble. The false SFD presents significant challenges to packet reception, depending on its position within the preamble. The AT transceiver is the most resilient to this manipulation, replying to at least some of the beacon requests in every scenario. Contrastingly, packet reception is ceases completely for transceivers XB, MC, EM, and ST when the false SFD replaces the second byte or later.

Figure 7:
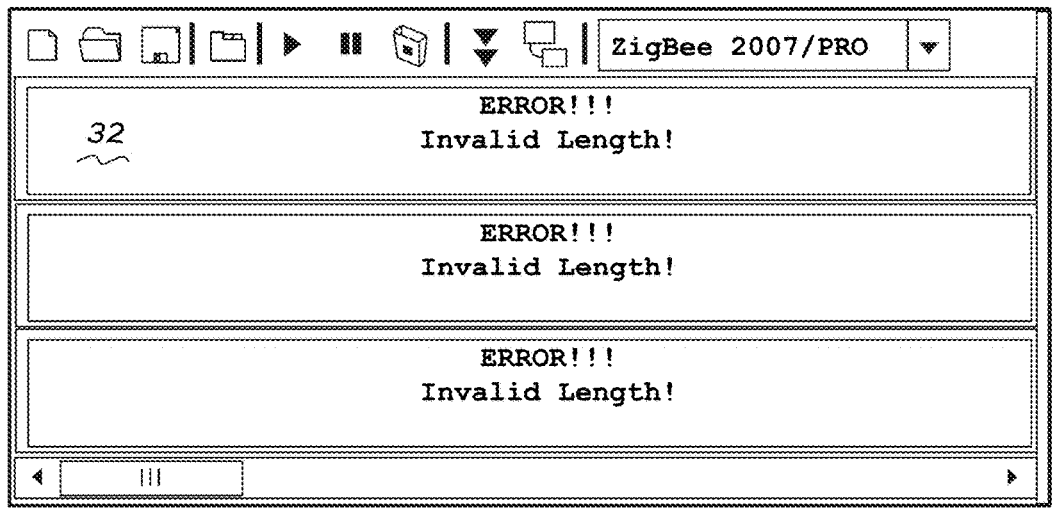
FIG. 7 illustrates invalid packet lengths reported by Texas Instruments hardware in response to preamble modifications.

The presence of a false SFD in the preamble caused packet reception failure due to misinterpreted length by analyzing packet reception with a Texas Instruments CC2531 packet sniffer. FIG. 7 is a reproduction of a screen shot from the TI SmartRF Packet Sniffer interface. Three incorrectly received packets 32 are in view, all modified with the 0x0000A700 preamble. For each observed packet the transceiver reports to the higher layers that the packet was of invalid length and is therefore indiscernible.

Table 8 reports packet reception rates in response to preambles with seven different 0xA nibble sequences. These preambles are non-standard, but do not cause disruption as significant as reported in Tables 6 and 7. These results provide insight into the packet reception limitations of the eight transceivers. For example, data in Tables 4, 5, 6, 7, and 8 suggests that the MC transceiver requires five trailing 0x0 nibbles in incoming packet preambles for successful message reception. Similarly, the TI and JN transceivers require two trailing 0x0 nibbles in incoming packet preambles for successful reception.

In addition to the preamble and SFD, there is a third field in the IEEE 802.15.4 PHY header: Frame Length. The Frame Length field consists of the byte following the SFD, as briefly mentioned above. Maximum frame length as specified by IEEE 802.15.4 is 127 bytes, so the most significant bit in the Frame Length byte should be ignored. However, the eight transceivers under test were evenly split as to how this most significant bit is handled. Table 9 illustrates that when the Frame Length field is set to the standard $10_d$, all eight transceivers receive and reply to incoming beacon requests. When the most significant bit of the Frame Length field is changed to a one, implying a frame length of $138_d$, transceivers XB, EM, ST, and TI cease to reply. This Frame Length manipulation significantly compliments the preamble manipulations in Tables 4, 5, 6, 7, and 8 and narrows the true hardware of the device under test to within one of four types.

Given the billions of possible PHY manipulations, an exhaustive analysis of all permutations is not necessarily practical. There are 816 possible eight-nibble preambles and this number significantly increases when longer or shorter variations are also considered. However, in order to predict transceiver response rates to various manipulations, a decision tree model was built in MATLAB using the data in Tables 4, 5, 6, 7, 8, and 9. Then PHY manipulations predicted to be useful by the model were randomly selected, tested, and incorporated in the results to generate new and more accurate models. This process was repeated for 200 generations, at which point five PHY manipulations were identified as notable in their exclusivity of reception. These five PHY manipulations are shown in Table 10. One of ordinary skill in the art will recognize that manipulations other than the five chosen may also be used with any of the embodiments.

The first preamble manipulation in Table 10 is also reported in Table 7. The uniqueness of this preamble is made more robust by combining it with the Frame Length manipulation $138_d$ reported in Table 9. Only the AT transceiver is able to receive beacon requests using this manipulated PHY. Similarly, only the FS transceiver can receive beacon requests with the third PHY manipulation listed in Table 10. The JN transceiver, which cannot be differentiated from the TI transceiver through preamble manipulations alone, can be uniquely identified when an invalid Frame Length is used in conjunction with the fourth preamble listed in Table 10. Results also suggest that the hardware designs of the XB and EM transceivers are so closely related that the two types may not be distinguishable through manipulation.

The above testing illustrates the embodiments of the invention utilizing preamble manipulation may be used to authenticate a wireless device based on its transceiver hardware type. In an exemplary configuration illustrated in FIG. 8, a USRP serves as a joining device 34 that initiates an association request, a Freescale MC13213 serves as a network coordinator 36, Freescale MC13213 end devices 38 form a functional network, and an Atmel AT86RF230 serves as a traffic sniffer 40 to observe all message traffic.

In a first illustrative scenario, PHY-augmented authentication is not active. The joining device 34 transmits an association request to the coordinator 36 using a standard PHY preamble, receives an acknowledgment, transmits a standard data request after a one-second wait, etc., completing the message sequence as illustrated in FIG. 2. The wireless sniffer 40 records the successful association request handshake as five packets displayed in the screen reproduction in FIG. 9. The coordinator 36 informs the joining device 34 that it has been accepted into the network and that is has been assigned a NWK address, in this case 0x796f.

In the next illustrative scenario, a PHY-augmented authentication process is active. The joining device 34 tests the true transceiver type of the coordinator 36 to ensure it is of the expected type and not an impostor. In this scenario a trusted coordinator 36 should have an Atmel AT86RF230 transceiver, but the device claiming to be the coordinator 36 is actually a Freescale MC13213. The joining device 34 authenticates the coordinator 36 by modifying the preambles on its transmissions such that only an Atmel AT86RF230 can receive them all. Specifically, its initial association request has uses the 0000A700 preamble and its data request one second later has a 0000000A preamble. Of the eight devices types under test identified above, only the Atmel AT86RF230 can receive both of these packets. FIG. 10 shows a reproduction of the resulting message traffic. The coordinator 36 cannot receive the modified association request, but it is observed by the Atmel AT86RF230 traffic sniffer 40. One second later the coordinator 36 correctly receives the modified data request and its transceiver automatically replies with an acknowledgment, but no association response is sent because the coordinator 36 is unaware of the initial association request. The joining device 34 is then aware that the coordinator 36 is not of the expected transceiver type.

This basic PHY-augmented authentication process is readily extendible to more complex handshakes including those using cryptography. If any part of the message handshake is not received by the intended recipient, the authentication fails. By crafting preamble modifications for packet reception by the smallest possible number of transceiver types, PHY-augmented authentication of remote hardware is achieved.

Figure 8:
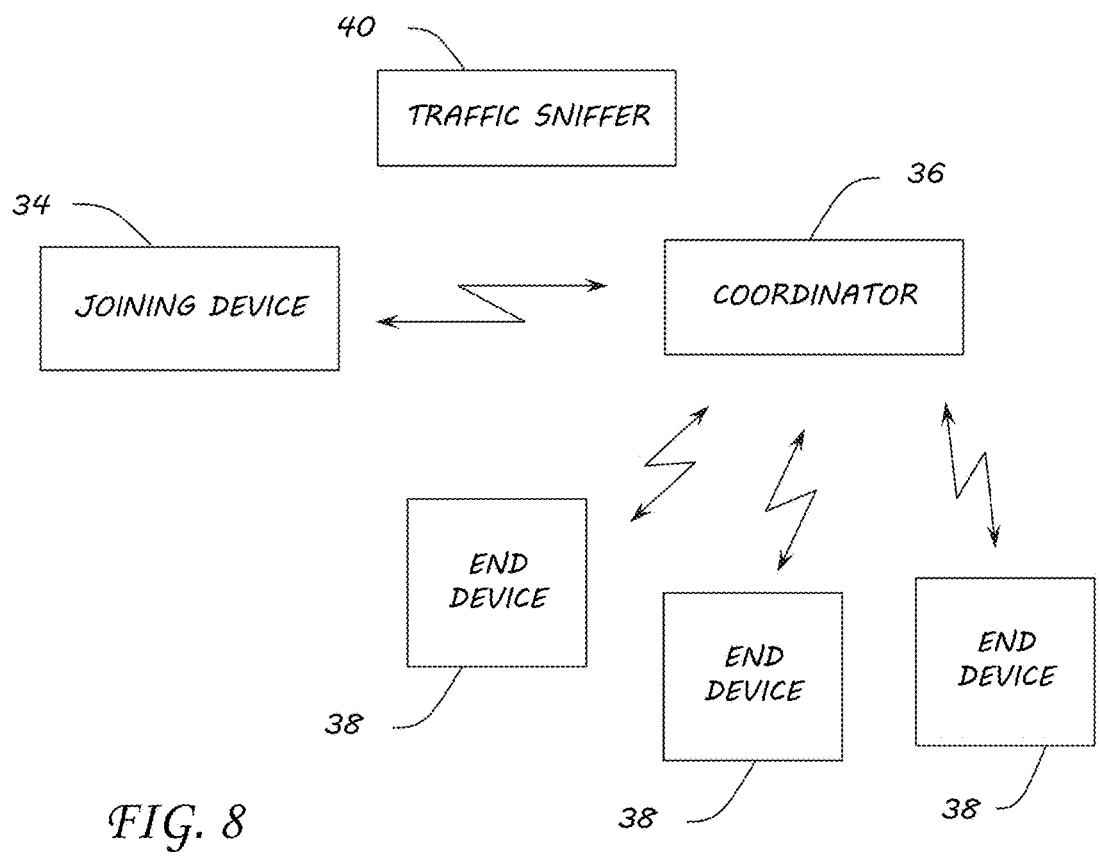
FIG. 8 is an exemplary PHY-augmented authentication setup.

PHY-manipulation-based authentication of joining devices mirrors the concept described above, but with the USRP serving as the coordinator 36 and an impostor device attempting the join the WPAN (FIG. 8). An actual hardware implementation of this concept would additionally include sequence number management. When the USRP serves as the joining device 34, it determines the sequence numbers of its association request and data request packets, requiring the coordinator 36 to reply with matching acknowledgment sequence numbers. When the coordinator 36 is a standard WPAN device, sequence number management is handled automatically by its software. Because the scenario illustrated in FIG. 8 requires PHY manipulation by the coordinator 36 to authenticate the joining device 34, acknowledgment sequence numbers from the USRP should match those originating from the joining device 34. This is not possible through the signal replays performed previously. Instead, the USRP should be configured with actual WPAN network functionality.

IEEE 802.15.4 network functionality is configured on the USRP using GNU Radio. This exemplary implementation uses USRP Hardware Driver (UHD) version 003.004.005 and GNU Radio version 3.6.1, running in Ubuntu 13.04 on a Dell Precision M4500 laptop. Preamble manipulations of outgoing transmissions from the USRP are accomplished through altering an ieee802_15_4_pkt.py script, where the preamble composition is specified.

In this scenario, an impostor CC2420 transmitter attempts to join the WPAN by transmitting a standard association request. The USRP coordinator 36 ensures that the joining device 34 is actually a MC13213 transceiver by sending its acknowledgments with a 0A07AA0A preamble and $138_d$ Frame Length. As illustrated above in Table 10, this particular PHY manipulation is receivable by MC13213 transceivers, but not by any of the other transceiver types under test. As a result, the authentication handshake fails and the CC2420 is unable to join the network. Even if the impostor joining device 34 "fakes" reception of the acknowledgment and proceeds with a data request anyway, the joining device 34 will not be able to receive the PHY-manipulated association response which contains address and joining information. Furthermore, the impostor will not be able to correctly reply to any further PHY-manipulated interrogations or inquiries from the coordinator 36, and thus will not be advertised to the WPAN as an authorized peer.

Figure 11:
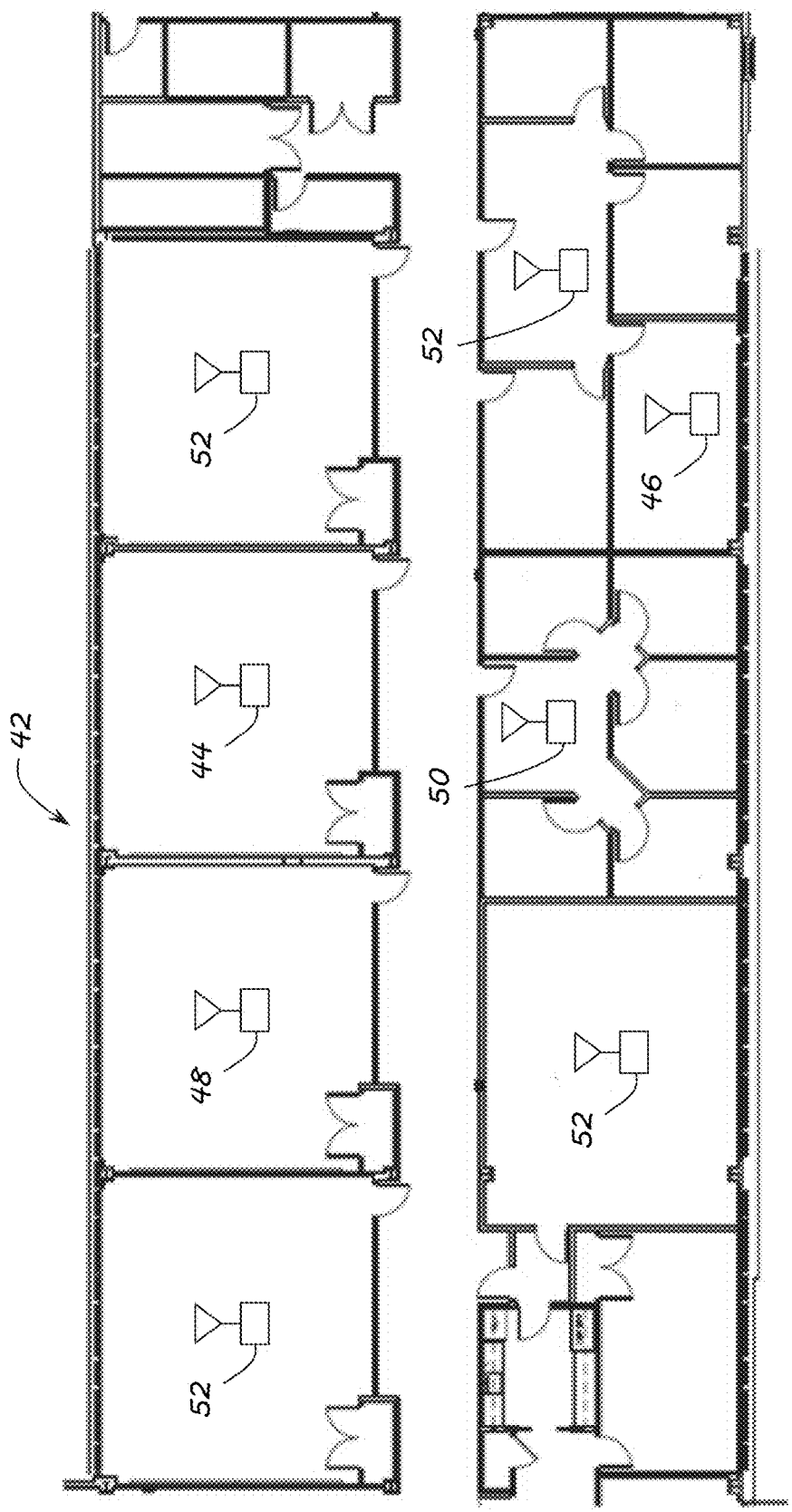
FIG. 11 is an exemplary diagram for device placement for intrusion detection.

Embodiments of the invention may be used in any number of practical applications. One such application includes real-time intrusion detection. In this exemplary application, a sensor network utilizing Jennic JN5148 transceivers may be placed throughout a building 42 as illustrated in FIG. 11. Three intruder devices 44, 46, 48 with alternate hardware may also be placed throughout: a Digi International XBP24CZPIS (44), a Freescale MC13213 (46), and a Silicon Labs EM357 (48). The intruder devices 44, 46, 48 are spoofing the MAC and network addresses of valid devices, which have been removed from the network. The intruder devices 44, 46, 48 can introduce false sensor measurements, conduct denial of service attacks, etc. Without PHY based discrimination techniques, all transceiver types are indistinguishable to the network and these intruders cannot be identified. However, by transmitting beacon requests that are not receivable by trusted hardware, any observed beacon replies must originate from untrusted devices. This occurs, and the imposter devices 44, 46, 48 identify themselves as having transceivers of an untrusted type.

A USRP 50 serves as an intrusion detection system transmitter. FIG. 11 illustrates the topology for all sensors. Four Jennic devices 52 form a mesh sensor network reporting temperature, humidity, and light levels to a graphic display.

Jennic JN5148 transceivers 52 cannot receive packets with the 000000AA preamble modification. In this intrusion detection example the USRP 50 transmits a beacon request with a 000000AA preamble modification once every few seconds at random intervals. The requests are dismissed as channel noise by the Jennic 52 sensor network being protected and rarely interfere with legitimate traffic. Packet error rate (PER) under interference conditions can be expressed as $$PER = 1 - [(1-P_b)^{N_z - \lceil T_c/b \rceil} \times (1 - P_b^I)^{\lceil T_c/b \rceil}] \quad (2)$$

where $P_b$ is the bit error rate without IEEE 802.15.4 interference, $P_b^I$ is the bit error rate with interference, $N_z$ is the number of bits in a packet, b is the duration of a bit transmission, and $T_c$ is the average collision time. The rate of collisions decreases even further if the transmitter implements carrier sense multiple access (CSMA).

All three intruder devices do receive packets with the 000000AA preamble. The IEEE 802.15.4 standard requires all full function devices to reply to beacon requests, so all intruding devices reveal themselves upon receiving each request.

The USRP 50 transmits ten 000000AA beacon requests within 70 seconds; ten replies are received from the XBP24CZ7PIS (44) and nine replies each are received from the MC13213 (46) and EM357 (48). All three intruder devices reply to the first nine requests, each time revealing their differing hardware within milliseconds. No replies are generated from any of the Jennic devices 52, as expected. Once identified, the intruder devices may be properly dealt with by either removing their addresses or other association with the WPAN or with actual physical removal of the device. Again, the number of transmissions may be more or fewer for other hardware configurations or with other embodiments of the invention.

In an alternative protection scheme, devices already joined to the network may be periodically audited with unicast packets. Any intruder device transceiver automatically replies to packets requesting acknowledgment, irrespective of software, thus immediately revealing its untrusted hardware. This alternative scheme may be preferable for heterogeneous networks with multiple transceiver types because devices may be audited individually.

These intrusion detection techniques compliment the authentication framework demonstrated above. If cryptographic credentials (such as a new NWK key) are distributed using the fourth PHY manipulation listed in Table 10, all three intruder devices will not have been able to intercept them. False keys could also be disseminated using 000000AA preambles, and the three intruders would reveal themselves upon trying to use them.

Another practical application of preamble manipulation techniques includes a methodology for classifying unknown transceiver hardware with high accuracy. In this application, an investigator can be either an attacker or a network auditor. The investigator does not know what hardware type is within a smart appliance, such as a smart utility meter. By transmitting a small number of beacon requests with manipulated PHY headers, the pattern of beacon replies and non replies allows the investigator to accurately identify the unknown hardware within.

Tables 4-10 above present preamble and Frame Length manipulations which can be used to accurately identify the transceiver type within an unknown or suspicious device. A classification decision tree 54 used to identify transceivers is presented in FIG. 12. Note, this is an exemplary decision tree and is but one of the many possible decision trees possible.

The process begins with successful reception of an ACK in block 56 from the device under test using a standard IEEE 802.15.4 PHY. This establishes that the device under test is powered and responsive. Next, up to two packets requiring acknowledgments are transmitted to the device under test with the most significant bit of the Frame Length incorrectly manipulated to a one in block 58. Once an ACK is observed in response to a manipulated packet, additional packets are not necessary at that decision step in the classification tree. As shown in Table 9, a reply in response to this manipulation narrows the true transceiver to one of four types. Two tries are allowed during the first test (falsified frame length) block 58 to account for any interference or a dropped packet.

If the device under test does reply to the false frame length, a PHY preamble of 0000000A is transmitted three times in block 60. A reply in response to this modified preamble then narrows the true transceiver to one of two types in block 62. In response to the reply, a PHY preamble of 0000A700 is transmitted two times. A reply from this transmission identifies the device 64 as an Amtel AT86RF230 ("AT"). No reply from the transmission identifies the device 66 as a Freescale MC13213 ("FS"). Returning to the 0000000A transmission in block 60, no response to this modified preamble narrows the true transceiver to one of two types. To identify the transceiver, a PHY preamble of FFFFF000 is transmitted two times in block 68. A reply to this modified preamble identifies the device 70 as a Jennic JN5148 ("JN"). No reply to the modified preamble identifies the device 72 as a Microchip Technology MRF24J40MA ("MC").

Returning now to the transmission of the false frame lengths in block 58, if no reply is returned, then a modified PHY preamble of FFFFF000 is transmitted three times in block 74. A response from this modified preamble, identifies the device 76 as a Texas Instruments CC2420 ("TI"). No response to the modified preamble identifies the device as one of Silicon Labs EM357 ("EM") (78), Digi International XBP24CZ7PIS ("XB") (80), or STMicroelectronics STM32W ("ST") (82). As seen in tables 2-10 above, of these remaining three devices 78-82, the ST device 82 may be singled out by further transmitting a PHY modified preamble of 0000A700, to which the ST device 82 will not reply. The remaining two devices, EM 78 and XP 80 as noted above, are indistinguishable by the methodology set out in the decision tree 54, and are thus classified as the same. Note that the number of tries may be arbitrarily increased or decreased at any decision point in the tree 54 to suit desired accuracy and energy efficiency requirements. The number of tries suggested throughout FIG. 12 is designed to result in greater than 99 percent correct classification accuracy.

While this model is predicted to be effective mathematically, it was also evaluated against real-world devices to demonstrate its effectiveness. Therefore, each of the eight device types was concealed one at a time in a cardboard box. The classification decision tree 54 was used to determine the true transceiver type within. An NI USRP-2921 served as the PHY manipulation transmitter and responses were observed by an AT86RF230 packet sniffer 0.5 meters distant. Table 11 reports the classification results of the eight trials. The number of packets required included the initial packet(s) used to confirm that the device under test is responsive. As expected, all transceivers under test are correctly identified as belonging to one of the six classes.

TABLE 11

Figure 12:
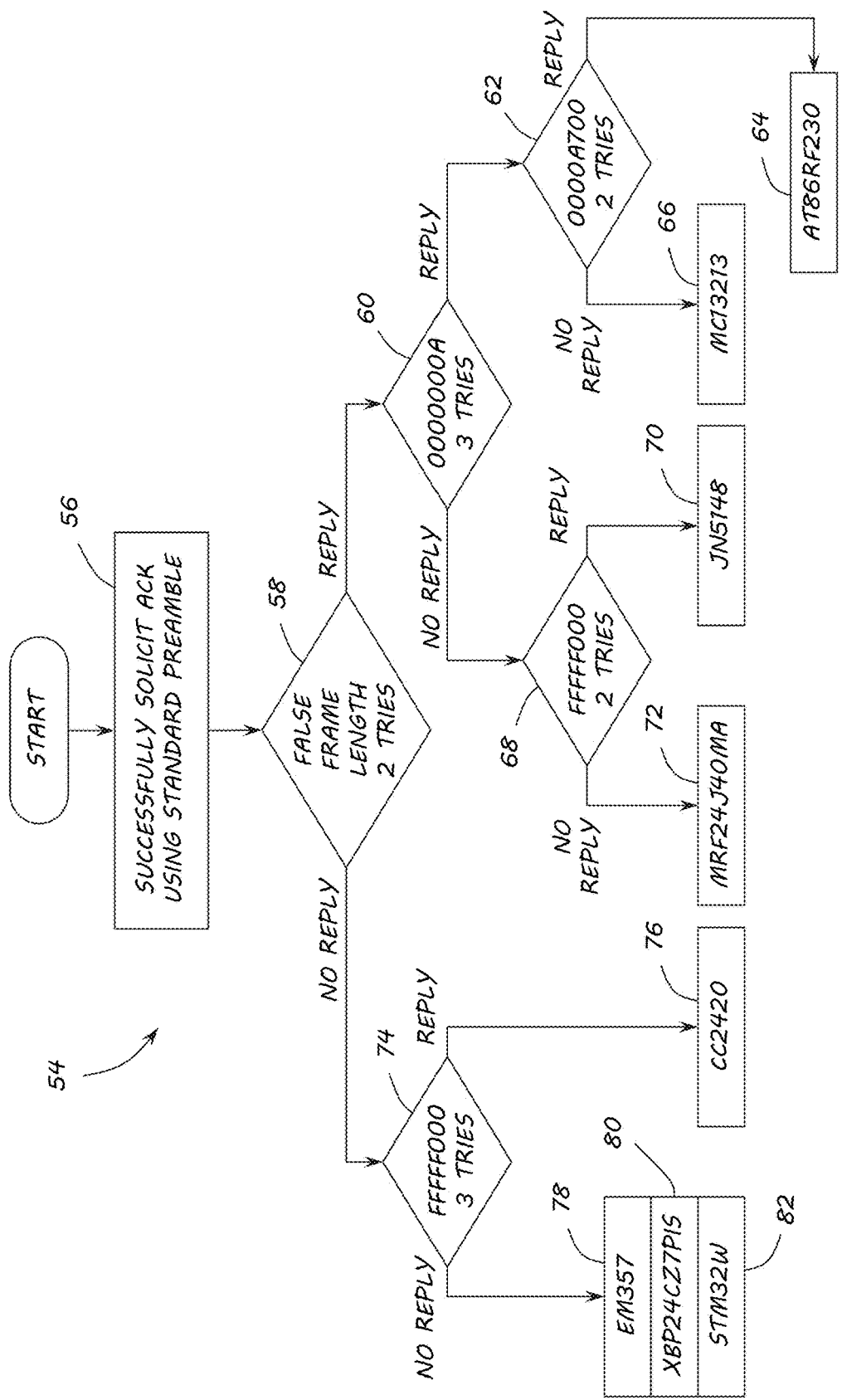
FIG. 12 is an exemplary classification decision tree for IEEE 802.15.4 transceivers.

Classification Results (Eight Real-World Device) Using Decision Tree in FIG. 12.

| Device | Packets Required | Accuracy |
| --- | --- | --- |
| AT | 4 | Correct |
| XB | 6 | Correct |
| FS | 5 | Correct |
| JN | 6 | Correct |
| MC | 7 | Correct |
| EM | 6 | Correct |
| ST | 8 | Correct |
| TI | 4 | Correct |

As with any form of security, there is potential for countermeasures to PHY manipulation intrusion detection and fingerprinting strategies. An attacker utilizing a trusted transceiver type against a PHY manipulation defense will not be detected. Of course, a physically-compromised trusted device will not be detected by sophisticated RF fingerprinting systems either. Note that embodiments of the invention utilizing PHY manipulation are envisioned as a novel tool for wireless situational awareness and a powerful component within a layered defense, rather than a security panacea.

One tactic for defeating PHY manipulation may be to determine whether or not the PHY of an incoming packet has been manipulated (and thus is a test). If an attacker can determine that an incoming packet preamble has been manipulated, the attacker can selectively ignore incoming packets with nonstandard preambles to mirror the response behavior of a particular transceiver type. Such deception is reminiscent of firewall-based obstructions to nmap operating system fingerprinting. Some arbitrary waveform generators and software-defined radios are able to provide this insight, which may not be accessible to low-cost commodity end devices. PHY information can be nontrivial to garner, even with a software-defined radio. For example, some IEEE 802.15.4 GNU Radio scripts for the USRP do not report incoming PHY headers. Instead, the entire incoming PHY header is abstracted away and a placeholder byte "0xff" is printed to the terminal when scripts based on the uhd_cc2420_rxtext.py are executed.

The alternative to analyzing incoming PHY headers is to physically alter the receiver characteristics of an attacking device to match those of the spoofed type. Review of datasheets associated with the eight device types under test reveals few options for PHY customization through registry value changes. The most promising flexibility is offered by CC2420 hardware. By altering the CC2420 SYNCWORD register, the required synchronization sequence for incoming transmissions can change from 0xA700 (as observed above) to 0xA7000. That is, a CC2420 transceiver can be made to require either two or three trailing 0x0 nibbles in incoming preambles. Fortunately, this minor flexibility is not sufficient to defeat the device classification tree in FIG. 12. In addition, no registry configurations alter the fact that CC2420 transceivers cannot receive packets with a manipulated frame length field, thus, there is presently no evidence of significant threats to PHY manipulation posed by standard end devices.

Figure 13:
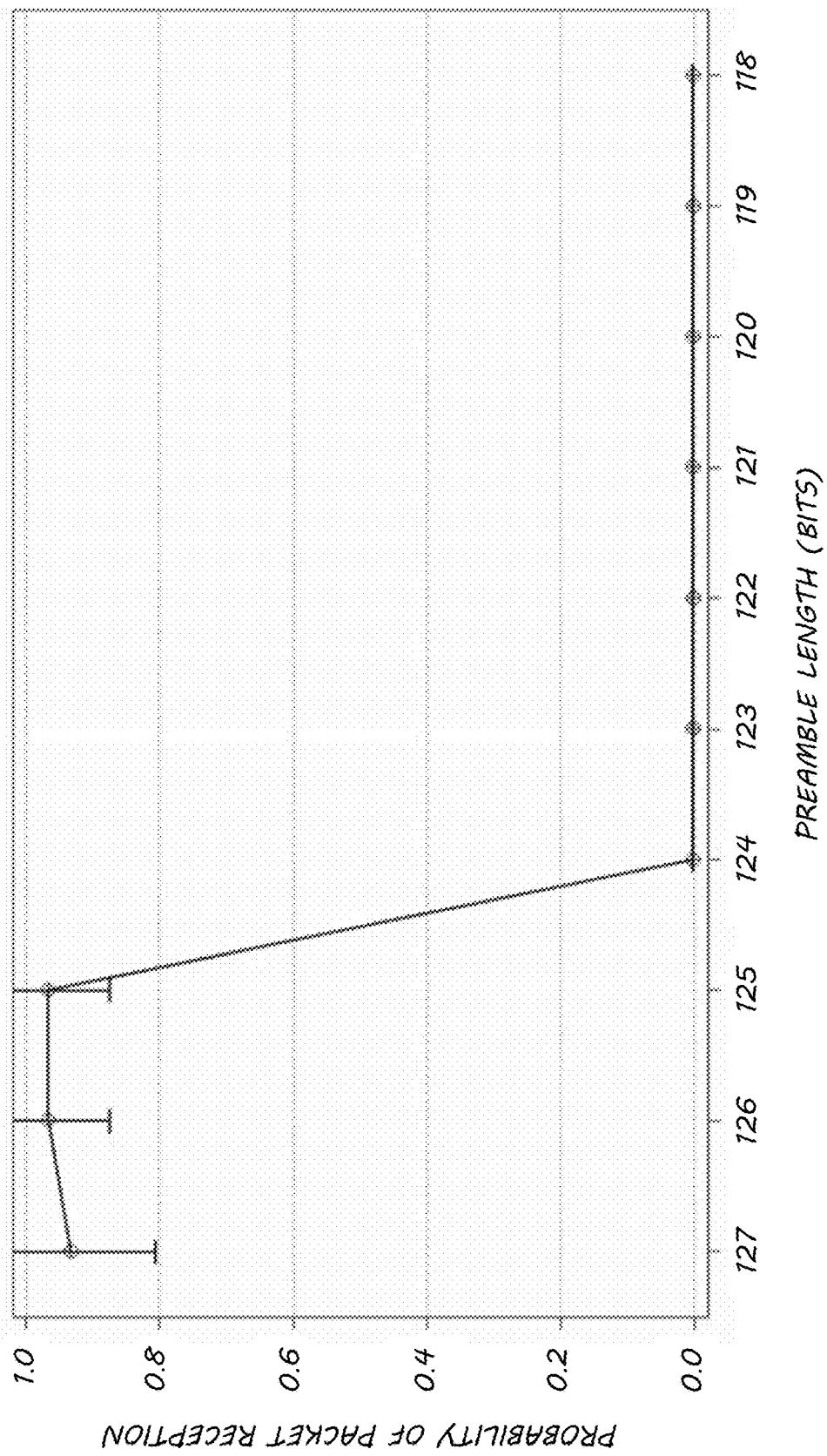
FIG. 13 is a graph representing packet reception versus preamble length for one embodiment of the invention.
Figure 14:
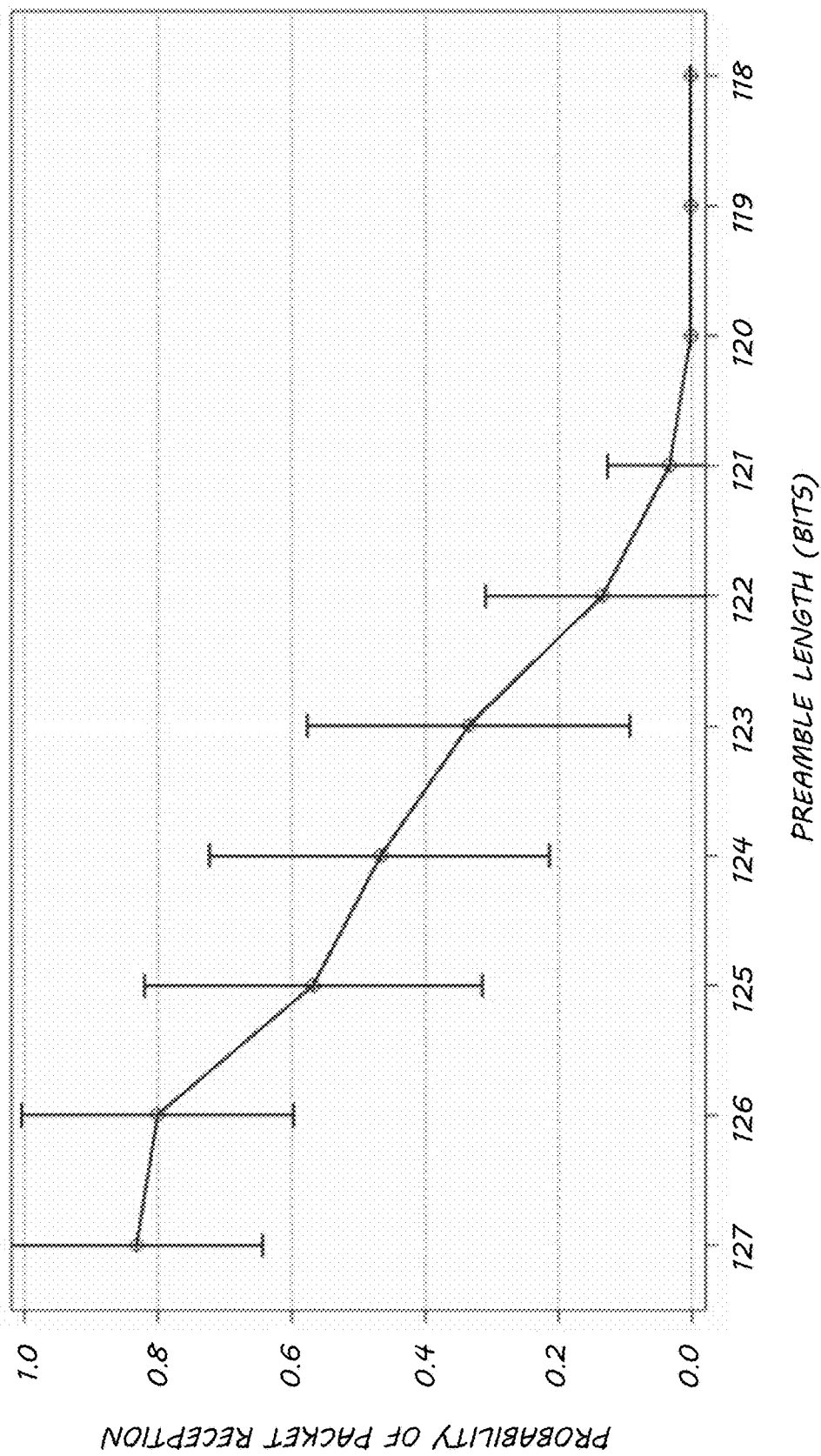
FIG. 14 is a graph representing packet reception versus preamble length for another embodiment of the invention.

Transmission preambles are featured in numerous wireless standards, including proprietary sub-GHz protocols and IEEE 802.11 local area networks (LANs). Embodiments of the preamble modification techniques may also be useful for classifying IEEE 802.11 device types. IEEE 802.11 protocols are generally more complex than IEEE 802.15.4. For simplicity, two transceivers operating at 2 Mbps on an IEEE 802.11b LAN were examined: an Atheros AR928X and an Intel 4965AG. Standard long preambles consist of 128 bits modulated at 1 Mbps. Each preamble bit is thus 1 ms long. 1 bit was removed from the preamble at a time for up to 10 bits, forming preambles ranging from 127 to 118 bits long. Although the IEEE 802.11b PHY, transmission frequency, and preamble durations all differ from IEEE 802.15.4, a similar methodology of signal recording as set forth above, modification in MATLAB, and replay on the USRP was followed. The wireless interfaces were monitored with Wireshark to observe incoming packets. Thirty modified packets were transmitted to the device under test for each preamble length and a 99 percent confidence interval was calculated for the mean. FIG. 13 reports packet reception probabilities for the Atheros AR928X, while FIG. 14 reports the equivalent probabilities for the Intel 4965AG.

Packet reception on the two devices vary significantly in response to shortened preambles. Reception rates decline abruptly on the Atheros transceiver, but decline somewhat linearly on the Intel transceiver. Notable preamble lengths are 124 and 120 bits. The Atheros transceiver does not receive packets with 124 bit preambles, while the Intel transceiver receives approximately 50 percent of the packets. Neither transceiver receives packets with preambles shorter than 121 bits. The significantly longer preambles of IEEE 802.11 result in a wider range of possible bit-wise manipulations than for IEEE 802.15.4. These results demonstrate that preamble modification can augment bit-layer security processes for multiple wireless protocols.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A method of establishing hardware identity of a coordinating device in a wireless network by a joining device, the method comprising:
    modifying a standard PHY preamble to a preamble that can be received by the coordinating device having an expected hardware configuration;
    transmitting the modified PHY preamble with an association request by the joining device; and
    in response to not receiving a reply containing an association response from the coordinating device by the joining device, determining the hardware configuration of the coordinating device is not the expected hardware configuration.

2. The method of claim 1, further comprising:
    in response to receiving a reply from the coordinating device, modifying the standard PHY preamble to a second modified preamble that can be received by the coordinating device having the expected hardware configuration and transmitting a request with the second modified preamble; and
    in response to not receiving a reply from the coordinating device by the joining device, determining the hardware configuration of the coordinating device is not the expected hardware configuration.

3. The method of claim 1, wherein modifying the standard PHY preamble comprises:
    shortening the PHY preamble.

4. The method of claim 1, wherein modifying the standard PHY preamble comprises:
    replacing a symbol in the PHY preamble with a nonstandard symbol.

5. The method of claim 4, wherein modifying the standard PHY preamble further comprises:
    replacing a frame length field of the PHY preamble with a nonstandard frame length field.

6. The method of claim 1, wherein modifying the standard PHY preamble comprises:
    replacing a frame length field of the PHY preamble with a nonstandard frame length field.

7. A method of characterizing a hardware identity of a joining device in a wireless network, the method comprising:
    transmitting a request with a first modified PHY preamble from a coordinating device to the joining device;
    in response to receiving a reply from the joining device, characterizing the joining device as a first hardware type;
    in response to not receiving a reply from the joining device, transmitting a request with a second modified PHY preamble different from the first modified PHY preamble from the coordinating device;
    in response to receiving a reply from the joining device, characterizing the joining device as a second hardware type; and
    in response to not receiving a reply from the joining device, characterizing the device as not the first or second hardware type.

8. The method of claim 7, wherein modifying the first PHY preamble comprises: shortening the first PHY preamble.

9. The method of claim 7, wherein modifying the first PHY preamble comprises: replacing a symbol in the first PHY preamble with a nonstandard symbol.

10. The method of claim 9, wherein modifying the first PHY preamble further comprises: replacing a frame length field of the first PHY preamble with a nonstandard frame length field.

11. The method of claim 7, wherein modifying the first PHY preamble comprises: replacing a frame length field of the first PHY preamble with a nonstandard frame length field.

12. A system, comprising:
    a wireless network;
    a coordinating device; and
    a joining device, the joining device configured to modify a standard PHY preamble to a preamble that can be received by the coordinating device having an expected hardware configuration, transmit the modified PHY preamble with an association request, and in response to not receiving a reply containing an association response from the coordinating device by the joining device, determine the hardware configuration of the coordinating device is not the expected hardware configuration.

13. The system of claim 12, wherein the joining device is further configured to:
    in response to receiving a reply from the coordinating device, modify the standard PHY preamble to a second modified preamble that can be received by the coordinating device having the expected hardware configuration; and
    in response to not receiving a reply from the coordinating device by the joining device, determine the hardware configuration of the coordinating device is not the expected hardware configuration.

14. The system of claim 12, wherein the joining device is configured to modify the standard PHY preamble by:
    shortening the PHY preamble.

15. The system of claim 12, wherein the joining device is configured to modify the standard PHY preamble by:
    replacing a symbol in the PHY preamble with a nonstandard symbol.

16. The system of claim 15, wherein the joining device is further configured to modify the standard PHY preamble by:
    replacing a frame length field of the PHY preamble with a nonstandard frame length field.

17. The system of claim 12, wherein the joining device is configured to modify the standard PHY preamble by:
  replacing a frame length field of the PHY preamble with a nonstandard frame length field.

18. The system of claim 12, wherein the wireless network is an IEEE 802.15.4 WPAN.

19. The system of claim 12, wherein the wireless network is an IEEE 802.11 WAN.

* * * * *